United States Patent [19]

Pinto

[11] 4,111,450
[45] Sep. 5, 1978

[54] MULTIPLE HOOK-UP, MOVABLE AXLE TRAILER WITH REMOVABLE TRACK EXTENSIONS, SLIDABLE KINGPIN, AND PIVOTAL AXLE ASSEMBLIES

[76] Inventor: Robert R. Pinto, 2800 Federal St., Camden, N.J. 08105

[21] Appl. No.: 818,194

[22] Filed: Jul. 22, 1977

Related U.S. Application Data

[63] Continuation-in-part of Ser. No. 788,182, Apr. 18, 1977.

[51] Int. Cl.² .............................................. B60D 1/16
[52] U.S. Cl. .................................. 280/405 A; 280/408
[58] Field of Search .......... 280/405 R, 405 A, 423 R, 280/423 A, 438 R, 474, 476 R, 408

[56] References Cited

U.S. PATENT DOCUMENTS

| | | | |
|---|---|---|---|
| 1,855,238 | 4/1932 | Higbee | 280/474 |
| 2,835,504 | 5/1958 | Acker | 280/405 A X |
| 2,986,408 | 5/1961 | Black | 280/423 R |
| 3,102,738 | 9/1963 | Roshia | 280/423 R X |
| 3,269,750 | 8/1966 | Tantlinger | 280/474 |

Primary Examiner—Joseph F. Peters, Jr.
Assistant Examiner—R. Schrecengost
Attorney, Agent, or Firm—Benasutti Associates, Ltd.

[57] ABSTRACT

A novel multiple hook-up movable axle trailer is disclosed comprising the features of removable track extensions to allow the positioning of slidable axle assemblies at extreme ends of the trailer to thereby attain a maximum bridging distance between axles. A novel slidable kingpin assembly is also disclosed which may be used to facilitate the alternate end hook-up of an appropriately fitted trailer regardless of the absence of a permanent kingpin in that location. Alternatively, the slidable kingpin assembly may be used in combination with a novel pivotal axle assembly which may either be fixed or have a fork attached thereto and be released for steering.

9 Claims, 4 Drawing Figures

MULTIPLE HOOK-UP, MOVABLE AXLE TRAILER WITH REMOVABLE TRACK EXTENSIONS, SLIDABLE KINGPIN, AND PIVOTAL AXLE ASSEMBLIES

CROSS-REFERENCE TO RELATED APPLICATIONS

The present application is a continuation-in-part of my prior co-pending patent application Ser. No. 788,182, filed Apr. 18, 1977 entitled "Multiple Hook-Up, Movable Axle, Container Cargo Trailer," which application is specifically incorporated by reference as if fully set forth herein.

BACKGROUND OF THE INVENTION

The present invention generally relates to trailers which are adapted to be hooked to and pulled by tractors. More particularly, the present invention relates to trailers which are suited for containerized shipments, such as those commonly handled by air cargo and/or sea transporters.

Commercially available trailers have changed only slightly over the last thirty years. These trailers comprise a load bed, a kingpin assembly adapted to be engaged by a tractor, one or more sets of wheels, and various peripheral equipment such as lights, bumpers, etc., particularly as required by the Interstate Commerce Commission. Generally, the load bed of a trailer is designed to facilitate the particular load type to be handled, as for example, a load bed or undercarriage adapted to carry a tank for hauling liquids, a flat bed configuration for hauling items secured thereto, or a van configuration for confining loose loads.

Any commercially acceptable trailer or trailering system must be compatible with standard tractors which have devices known to the industry as "fifth wheels", mounted thereon which are adapted to grip and pivot with respect to the kingpins of the trailers to which they are attached. The coupling operation of a fifth wheel to a kingpin merely involves moving the tractor so that the kingpin is guided through a tapered slot in the fifth wheel to an appropriate position, after which a handle on the side of the fifth wheel is pulled to close jaws around the kingpin to complete the tractor-trailer engagement.

Over the last 30 years, the trend in trailer construction has been to lighten the weight of the trailer while maintaining suitable strength characteristics so that heavier payloads could be accommodated while meeting the various weight requirements imposed by each state, particularly concerning the weight carried by each axle and the bridging distance permitted between axles. Accordingly, most trailers which have been constructed in recent years have been built with abbreviated understructures disposed in the vicinity of the rear axles, thereby substantially reducing the weight of the understurcture while providing sufficient support in the axle region to handle most loads. Similarly, the use of "sliders" in connection with these abbreviated understructures has gained wide-spread acceptance in the industry. These sliders generally allow a double axle assembly supporting the rear of the trailer to be moved relative to the underside of the trailer for a distance of approximately nine feet (for a forty foot trailer), so that, depending upon the particular load and state weight requirements, a load may be appropriately balanced between the tractor and trailer. In order to reduce tread wear and increase the efficiency of a given trailer when that trailer is being pulled in an empty or partially loaded condition, the industry has also, when appropriate, utilized axles which may be selectively retracted vertically away from the road surface to reduce the number of tires in contact with that surface when that axle is not needed.

In spite of the approaches discussed above, most trailers presently in use are subject to certain drawbacks which result in less efficient load transportation and higher maintenance and service costs. In particular, virtually all trailers now in use are equipped with landing gears which, during the hauling thereof, are folded under the trailer body. These may be lowered to support the front end of the trailer when that end of the trailer is not supported by a tractor. Since the trailers themselves are quite heavy, landing gears are normally powered by variable speed winches which move the landing gears into position. Although vital when needed, landing gears are basically superfluous to the operation of each trailer during hauling. It has not been economic, therefore, to construct landing gears which are so rugged and durable as to adequately support certain trailers in the fully loaded condition. Further, these landing gears are particularly prone to failure or damage during the hook-up operation when a tractor backing into the trailer to grab the kingpin may exert substantial torques on the landing gear.

Very recently, the above described problems of cargo shipment have been complicated by the increasing use of containerized shipments, and particularly shipments of containers having dimensions approximately ten or twenty feet long and the full width of a trailer body. While these relatively large containers have gained widespread acceptance in the air and sea transport industries, they have created considerable difficulties for truckers who normally deliver the contents of such containers locally, as for example, to standard loading docks where final unloading of the transported materials is to take place. Conventionally, twenty foot containers are provided with a single set of cargo doors disposed at one end thereof. Accordingly, as a standard procedure, many haulers have adapted twenty foot cargo beds to receive such containers, to buckle those containers to those beds and to transport each container individually to its destination.

While it may appear that a conventional flat bed, forty foot long trailer could be adapted to handle two twenty foot trailers, in reality this con-figuration is not feasible if it is desired that the contents of each of the containers are to be unloaded while the containers are on the bed, as is normally the case. This is because cargo access at the end of at least one of the two containers is restricted by door placement. To attempt to unload a twenty foot container from the side is not economical since almost all loading docks are adapted for end loading trailers.

Very recently, one approach which has been taken by Seaboard World Airlines is the provision of two couple-able chassis, each of which is intended to receive a single twenty foot cargo container. Essentially, each chassis is a twenty foot trailer comprising a load bed, landing gear, and axle assembly which is mounted on a sliding sub-chassis. Each of these trailers may be coupled together to be pulled by a single tractor according to the following procedure a first of the trailers having the container positioned thereon is appropriately located with the landing gears and struts in the down position while the second trailer is coupled to a trailer and the landing gear put in the up position. The wheels on the second trailer are then locked and the cab moved forward so that the sub-chassis and wheels of the second trailer extend backward beyond the end of the second container. The chassis may be operated in this position or alternatively may be backed into the first trailer so that the kingpin of the first trailer will engage with the locking guides in the extended sub-chassis of the second trailer. The landing gear of the first trailer may then be moved to the up position after which the slider on the second trailer is again released on the entire unit moved forward until the wheels of the second trailer have extended even further into a correct position for a one hundred and twenty inch tandem setting, whereupon the slider of the second trailer is again locked and the slider of the first trailer released and brake set. The entire unit may then move backwards relative to the wheels of the first trailer until the two suspensions automatically unite into a load equalizing tandem wherein the axles of the first and second chassis are adjacent to each other.

As seen from the above description, while the coupleable trailer approach will facilitate the transport of two 20 foot containers by a single tractor, this benefit is achieved at the expense of a relatively elaborate coupling procedure which requires the tractor operator to leave the cab five times to couple or un-couple one trailer from the other. Additionally, in order to effect delivery of the contents of the containers, it is necessary to go through the coupling and uncoupling procedure many times in order to facilitate access to each of the containers. Accordingly, although this system has achieved some success, the complexity of this system and its susceptibility to damage, particularly landing gear damage, during the coupling and uncoupling operation, has limited its widespread application in the industry.

When it is desired to haul greater loads than may be easily accommodated on a single trailer, the industry has occasionally resorted to the use of "dogs," which are additional trailers, usually with pivotal front axles, attached in tandem to the preceding trailer, usually through a hook-and-eye or ball hitch arrangement. While this type of transport has achieved some success, its use has been severely limited by safety problems as well as by difficulties in distributing loads between the front and rear trailers and in handling the rear trailer, as for example, during the unloading and tight-quarter maneuvering.

SUMMARY OF THE INVENTION

The present invention represents improvements over the invention described in my prior copending patent application Ser. No. 788,182, filed Apr. 18, 1977 entitled, "Multiple Hook-Up, Movable Axle, Container Cargo Trailer," which application is incorporated herein by reference. The present invention relates to the provision of a movable axle trailer comprising track extension means for selectively extending the trailer's cargo bed tracks to allow one or more axle assemblies to be slid to positions with respect to the cargo bed which would otherwise be part of the coupling portion of the cargo bed, i.e., that portion of the cargo bed adjacent the kingpin where no track is normally affixed for tractor clearance purposes. Low profile track extension brackets are permanently attached to the underside of the cargo bed across the coupling portions on either side of the kingpins at each end of the cargo trailer. These brackets are adapted to receive a pair of track extension "I" beams which are slid into position from the end of the trailer to abut the fixed track portions, to thereby extend those tracks across at least a portion of the coupling portion of the trailer. In the preferred embodiment, a plurality of pneumatic cylinders with spring biased cylinder rods are incorporated within the cargo bed to extend to mate with complemental bores in the track extension "I" beams, to thereby lock those "I" beams in place in the running position, while facilitating the sliding withdraw of those "I" beams with respect to the cargo bed in response to remote activation.

The present invention also comprises a slidable kingpin means which is adapted to slidably engage tracks positioned longitudinally on the undersurface of a cargo bed, for selective positioning along the cargo bed to thereby enable coupling of the cargo trailer to a tractor through its "fifth wheel" or, alternatively, for coupling to a novel, steerable axle assembly, as will be described more fully hereinafter. Where the novel kingpin assembly is used in combination with a cargo trailer having tracks spanning its entire length and one (preferably two) or more slidable axle assemblies, a trailer suitable for alternate direction hauling, self supporting storage and flexible load distribution is inexpensively attained.

I have also invented a novel, steerable axle means comprising a fifth wheel and removable fork, which steerable axle means is adapted for coupling to a conventional kingpin, and many, therefore, be used in associated with the novel slidable kingpin assembly of the present invention. In the preferred embodiment, this steerable trailer assembly, and the aforementioned kingpin assembly are provided with interlocking means so that, when desired, the steerable axle assembly may be used as a non-pivoting, slidable axle. In this instance, the steering fork is easily removed and may be stored for later use.

Accordingly, a primary object of the present invention is the provision of an improved cargo trailer exhibiting superior flexibility.

Another object of the present invention is the provision of removable track extensions for use with a multiple hook-up, movable axle container cargo trailer.

Another object of the present invention is the provision of a slidable kingpin assembly for use with a cargo bed having a plurality of tracks mounted thereon.

A further object of the present invention is the provision of a novel, slidable, steerable axle assembly for use with a multiple hook-up, movable axle container cargo trailer.

A further object of the present invention is the provision of a novel, steerable axle assembly for use with a conventional kingpin.

These and other objects of the present invention will become apparent from the following more detailed description.

DETAILED DESCRIPTION OF THE DRAWINGS

In certain jurisdictions, and for certain load handling requirements, it is desirable to provide supporting axles at the rearmost position of a cargo trailer so that maximum bridging distances, i.e., distances between axles, may be established. As described in my aforementioned patent application entitled, "Multiple Hook-Up, Movable Axle, Container Cargo Trailer," substantial advantages may be attained by providing a trailer having a plurality of fixed tracks spanning between two coupling positions located at generally opposite ends of an elongate trailer. These advantages include the facilitation of tractor coupling to either end of the trailer which, in combination with a movable axle feature, facilitates the backing of the trailer into loading docks from either end. In the embodiment illustrated in the aforementioned patent application the tracks are disclosed as spanning between the coupling portions of the cargo bed, with those areas around the kingpin required for tractor clearance being maintained clear, i.e., without tracks.

The present invention provides a plurality of removable, extension track sections which may be slid into channels defined by a plurality of low profile brackets attached to the underside of the cargo bed across its coupling portions. These extension track sections are then locked to the bed and may receive slidable axle or kingpin assemblies. These assemblies may be slid onto the extension track sections from the fixed tracks or may be newly introduced thereon from the end of the trailer. The track extensions may, therefore, be fitted to extend across whichever coupling portion which is not then to be coupled to a tractor.

Figure 1:
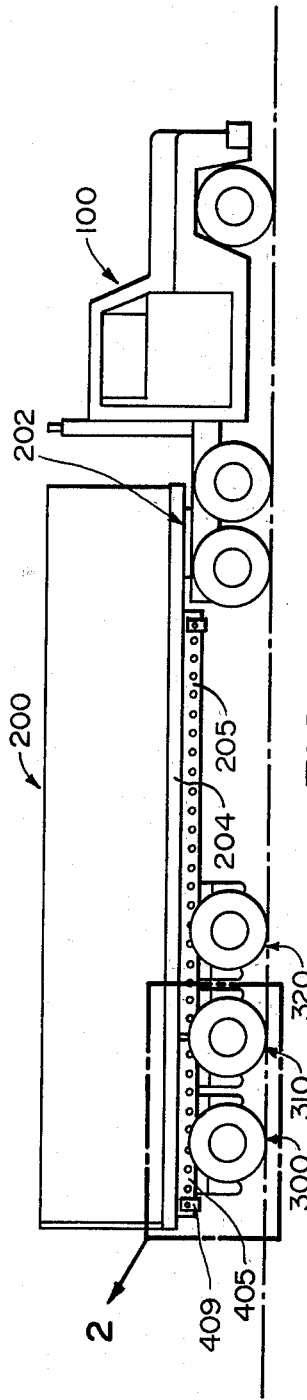
FIG. 1 is a side view of the preferred embodiment trailer of the present invention showing one entire axle assembly and a portion of a second axle assembly supporting the rear portion of that trailer through track extensions which have been fitted entirely across that coupling portion of the trailer.
Figure 2:
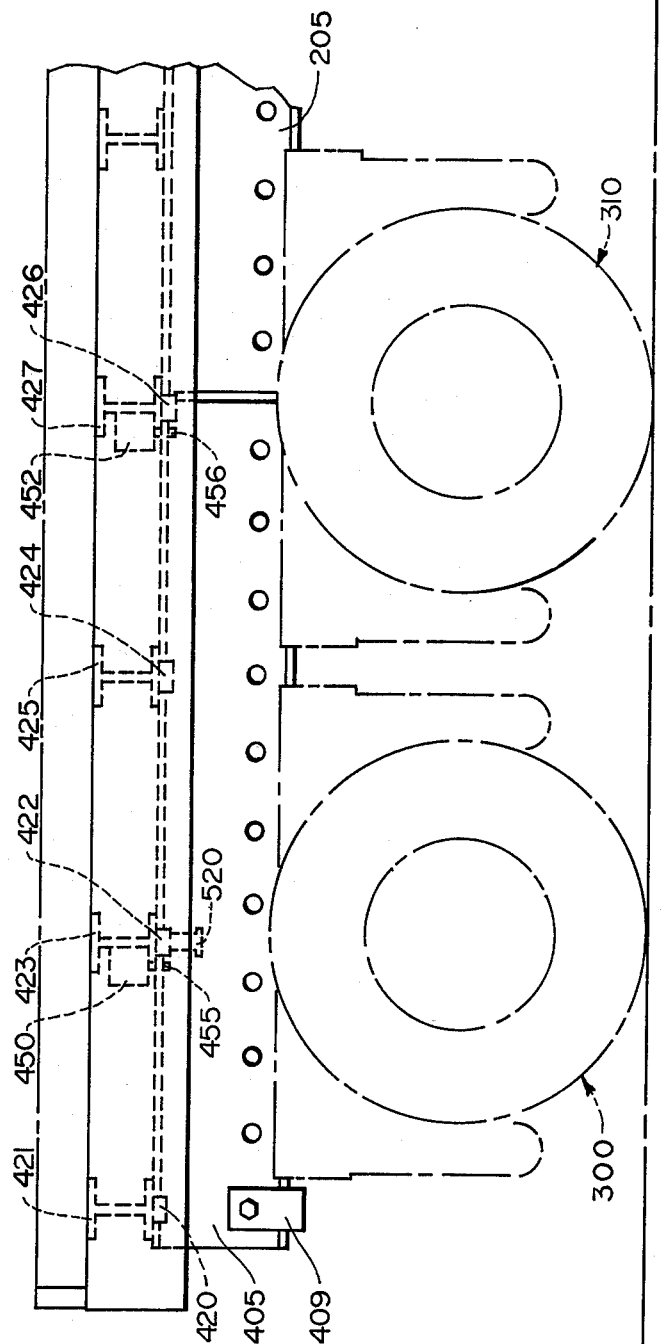
FIG. 2 is a greatly enlarged side view of a portion of the rear portion of the trailer illustrated in FIG. 1, taken as illustrated by the lines and arrow 2 in FIG. 1.

Referring now to FIG. 1, the preferred embodiment trailer designated generally 200 is shown coupled to a tractor designated generally 100 at a coupling portion designated generally 202 which, for purposes of the present discussion, will be referred to as the "front" coupling portion of the trailer, even though it is to be understood that this same portion may, in fact, be the "rear" coupling portion if the elements of the tractor are repositioned so that the tractor 100 is coupled to the other end. Located generally on the undersurface of the trailer cargo bed 204 are fixed tracks, as disclosed in my aforementioned patent application, only one of which tracks, track 205, is shown in FIGS. 1 and 2. A plurality of axle means designated generally 300, 310 and 320 have been slid to an endmost position on trailer 200 so that axle means 300 and 310 support the trailer, at least in part, through track extensions 405 and 407. The axle assemblies are locked in the positions shown in FIG. 1 through locking means as disclosed in my aforementioned copending patent application. Axle assembly or means 300, and axle means 310 are locked to track extensions 405 and 407 respectively, and are additionally prevented from sliding off the track extensions by service brackets bolted to the end of each track extension, service bracket 409 being shown in FIG. 1.

Referring now to FIG. 2, which is an enlarged side view of a portion of the "rear" of the trailer 200, low profile brackets 420, 422, 424 and 426 are shown welded to the undersurface of transverse "I" beams 421, 423, 425 and 427 respectively. Accordingly, these transverse "I" beams define a suitable longitudinal surface ideal for support through track extensions 405 and 407 which, in the preferred embodiments are also "I" beams as illustrated in the drawings. As shown in FIG. 2, the track extensions extend across substantially the entire length of the coupling portion, that is the distance between the end of the trailer and the end of track 205 (at transverse "I" beam 427). The "rear" kingpin 520 is shown in dotted outline in FIG. 2 mounted on the undersurface of transverse "I" beam 423.

Figure 3:
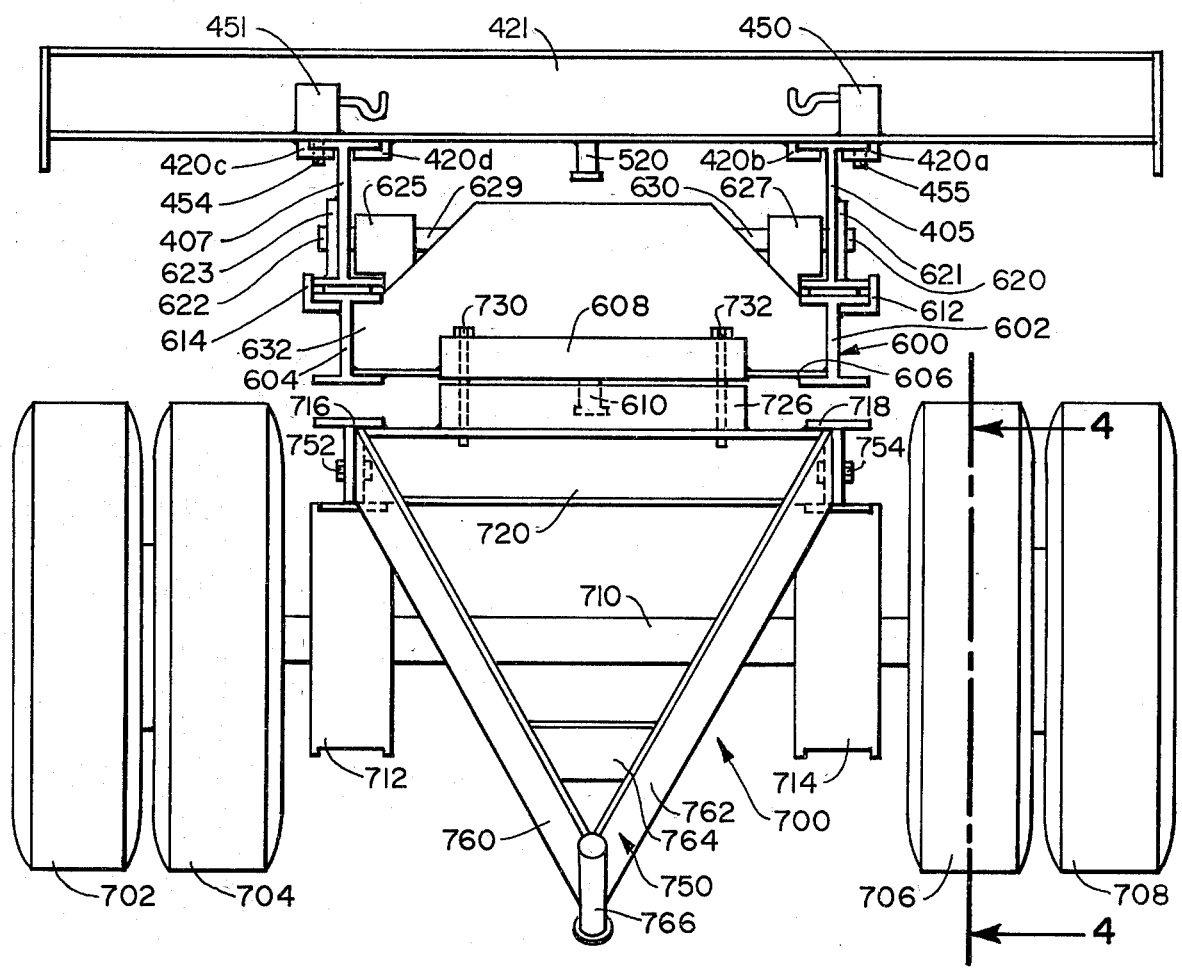
FIG. 3 is a greatly enlarged rear view of a trailer in accordance with the present invention showing track extensions fitted thereto and additionally showing a slidable kingpin assembly positioned therealong to which the preferred steerable axle assembly has been coupled.

Referring now to FIGS. 2 and 3, the low profile brackets define in combination with the lower surface of the transverse "I" beams two generally "T" shaped track extension channels adapted to receive the upper ends of the "I" beams which comprise track extensions 405 and 407. When kingpin 520 is not to be coupled to a fifth wheel, the channels are cleared by activating a plurality of pneumatic cylinders 450, 451, and 452 mounted on transverse "I" beams 423 and 452 generally above the channels, which activation acts to withdraw the cylinders' piston rods 454, 455 and 456 upwardly into the cylinder to prepare the channel for receipt of the track extensions. The track extensions 405 and 407 may then be slid longitudinally into the channels to their appropriate operating positions, whereupon the air cylinders may be deactivated so that the cylinder rods 454, 455, and 456, which are spring biased towards their extended positions, will extend through complementally formed bores in each of the track extensions to lock those track extensions in their operating positions. The track extensions will now function as continuous extensions of the fixed tracks mounted on the undersurface of the cargo bed and may, as such, slidingly receive axle or kingpin assemblies from either end thereof, as illustrated in the figures.

Figure 4:
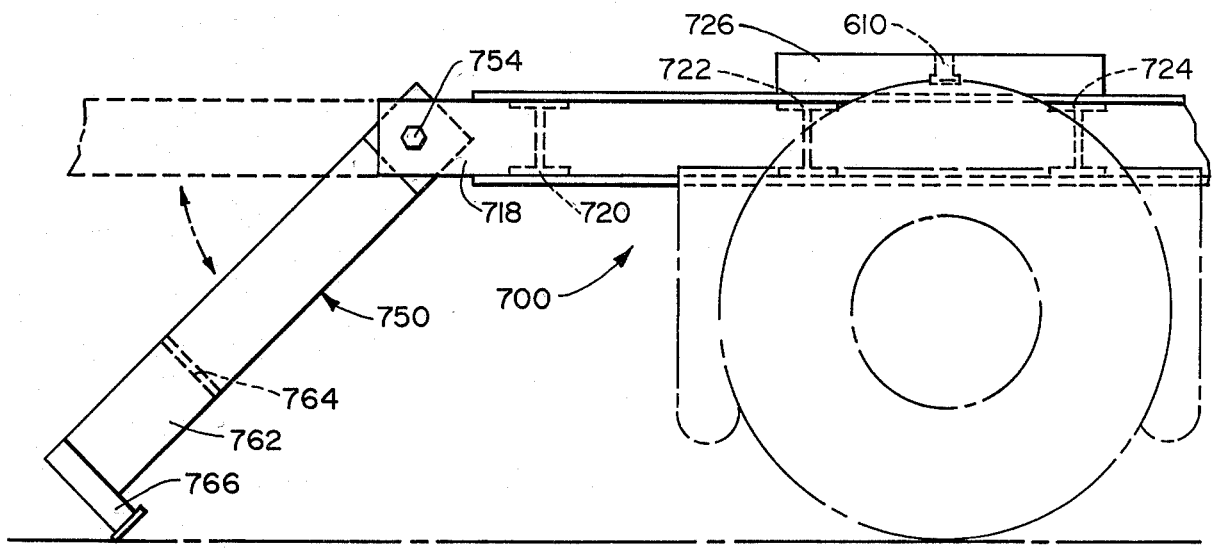
FIG. 4 is a view taken as indicated by the lines and arrows 4—4 on FIG. 3 showing the interrelationship between the removable fork and the frame of the steerable axle assembly.

Referring now in particular to FIGS. 3 and 4, the novel slidable kingpin means designated generally 600 and steerable axle means designated generally 700 are illustrated. The slidable kingpin means comprises a plurality of longitudinal "I" beams 602 and 604 which are cross-braced by suitable transverse "I" beams (not shown in the drawings) to comprise the kingpin carriage. Kingpin mounting plate 606 extends across the undersurface of this carriage and serves as a mounting for kingpin base 608, from which kingpin 610 downwardly protrudes. Carriage tracking brackets 612 and 614 are welded to the underside of each top parallel member of "I" beams 602 and 604 to insure that the unit may not be displaced transversely with respect to "I" beams 405 and 407, along which they track. The mechanism for locking the slidable kingpin carriage with respect to "I" beams 405 and 407 is, in the preferred embodiment, identical to the locking means disclosed for the axle means in my aformentioned patent application. Accordingly, locking pins 620 and 622 are shown biased towards their extended positions through apertures formed in the tracks 405 and 407 and through reinforcing plates 621 and 623. Pin housings 625 and 627, connecting rods 629 and 630 and reinforcing partition 632, all of which are illustrated in FIG. 3, accordingly, function in the same manner as described for those corresponding components of the axle means described in my aforementioned patent application. The slidable kingpin means for coupling the trailer with a suitable vehicle fifth wheel easily slides to any of a variety of appropriate coupling positions with respect to the tracks disposed on the undersurface of the cargo bed of the trailer. Once in position the means is locked with respect to those tracks. Since, as shown in the drawings, the slidable kingpin 610 protrudes below the slidable kingpin carriage, pivotal clearance for engagement with a "fifth wheel" is established.

The preferred embodiment of the present invention additionally comprises a pivotal-slidable axle means for supporting and steering at least a portion its associated trailer. The wheels 702, 704, 706, and 708, axle 710 and associated suspensions 712 and 714 of this assembly are similar to the corresponding mechanisms described in my aforemention copending patent application. The rails 716 and 718 which are supported thereby are, in this embodiment, interconnected by a plurality of cross members 720, 722, and 724 extending therebetween, to comprise a frame. Cross members 722 and 724 additionally act as supports for fifth wheel 726 mounted on the upper surface of the frame which receives and engages kingpin 610 in a conventional manner. When it is desired to use the axle assembly 700 in its non-pivotal mode, one or more bolts or pins 730 and 732 are fitted into axially aligned bores through the kingpin base plate 608 and fifth wheel 726 to prevent relative rotational movement of the fifth wheel around kingpin 610. When the axle assembly 700 is to be used in its steerable mode, a fork designated generally 750 is fitted to the terminal portions of rails 716 and 718 using loosely fitted bolts 752 and 754 or other suitable interconnection means so that the fork 750 may easily pivot therearound as illustrated in FIG. 4 of the drawings. The fork 750 comprises arms 760 and 762 reinforced by brace 764 and welded to hitching member 766 which may be a hook, ball-hitch, or any other suitable hitching member known to the art. Clearance for pivotal movement of the fork 750 with respect to rails 718 and 716 is provided by foreshortening the parallel portions of those rails to allow the transverse or central portions thereof to extend outwardly to overlap adjacent corresponding portions of the fork. Easy access to the attachment site of the fork with the reaminder of the unit is, therefore, provided and the axle assembly is easily interchanged between its fixed and steerable modes.

It will be understood that various changes in the details, materials and arrangement of parts which have been herein described and illustrated in order to explain the nature of this invention may be made by those skilled in the art within the priniciple and scope of the invention as expressed in the following claims.

What is claimed is:

1. A cargo trailer comprising:
   (a) a substantially elongate cargo bed;
   (b) a plurality of coupling means disposed at generally opposite ends of said cargo bed for alternatively coupling to the fifth wheel of a vehicle;
   (c) at least one axle means for supporting said bed;
   (d) fixed track means associated with said bed spanning continuously between said coupling means on said bed; said axle means slidably engaging said track means for selective positioning therealong; and
   (e) track extension means for removable attachment to said bed to extend said fixed track means across at least a portion of said coupling means and for slidably receiving said axle means, therefrom to thereby increase the maximum bridging distance between said axle means and said vehicle.

2. The invention of claim 1 wherein said track means and said track extension means each comprise axially aligned "I" beams extending along the undersurface of said cargo bed.

3. The invention of claim 1 wherein said track extension means comprises a plurality of low profile brackets permanently affixed to the undersurface of said cargo bed to define, in combination with said undersurface, a "T" shaped track-extension receiving channel; and a plurality of track extension members, at least a portion of which members are matingly received by said channel.

4. The invention of claim 3 wherein said track extension means further comprises pin means for locking said track extension members in at least one operating position within said channel.

5. The invention of claim 4 wherein said pin means comprises a plurality of pins biased to extend through said channel.

6. The invention of claim 5 wherein said pins are the cylinder rods of pneumatic cylinders mounted on said cargo bed adjacent to said channel.

7. A cargo trailer comprising:
   (a) a substantially elongate cargo bed;
   (b) at least one axle means for supporting said cargo bed;
   (c) track means associated with said bed extending longitudinally between opposite ends of said bed, said track means slidably engaging said axle means for selective positioning of said axle means therealong; and
   (d) slidable kingpin means for coupling said trailer to a vehicle's fifth wheel, said kingpin means also slidably engaging said track means for selective positioning therealong, whereby alternate end hook-up of said trailer is facilitated.

8. The invention of claim 7 wherein said kingpin means comprises:
   (i) a kingpin; and
   (ii) a kingpin carriage slidably engaging said track means, said carriage having said kingpin mounted thereon.

9. The invention of claim 7 wherein said kingpin carriage further comprises a plurality of longitudinal rails and at least one locking means mounted on said carriage for selectively locking said carriage with respect to said track means.

* * * * *